United States Patent
Mori

(10) Patent No.: US 6,829,068 B2
(45) Date of Patent: Dec. 7, 2004

(54) OPTICAL SCANNER AND IMAGE FORMING APPARATUS USING THE SAME

(75) Inventor: Seiichiro Mori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/436,997

(22) Filed: May 14, 2003

(65) Prior Publication Data

US 2004/0047015 A1 Mar. 11, 2004

(30) Foreign Application Priority Data

May 15, 2002 (JP) .......................... 2002-139927
May 13, 2003 (JP) .......................... 2003-134506

(51) Int. Cl.$^7$ .............................................. G02B 26/08
(52) U.S. Cl. ........................................................ 359/204
(58) Field of Search ............................... 359/204, 205, 359/206, 216; 347/233, 235

(56) References Cited

U.S. PATENT DOCUMENTS

| | | | | |
|---|---|---|---|---|
| 4,796,964 A | * | 1/1989 | Connell et al. | ............. 359/204 |
| 6,256,132 B1 | | 7/2001 | Ishibe | ......................... 359/204 |
| 6,628,444 B2 | * | 9/2003 | Azami | ......................... 359/204 |
| 2001/0015747 A1 | | 8/2001 | Ishibe | ......................... 347/129 |
| 2003/0025783 A1 | | 2/2003 | Mori | ......................... 347/234 |

FOREIGN PATENT DOCUMENTS

| | | |
|---|---|---|
| JP | 2001-059945 | 3/2001 |
| JP | 2001-228422 | 8/2001 |

* cited by examiner

*Primary Examiner*—Euncha P. Cherry
(74) *Attorney, Agent, or Firm*—Fitzpatrick, Cella, Harper & Scinto

(57) ABSTRACT

A multibeam optical scanner has a plurality of light sources each of which has a plurality of light emission points. In order to reduce the influence of image misregistration between scan lines in the main scanning direction even in the state where positioning error between an optical scanner and a drum exists, the distance occupied by all of the spots on the surface to be scanned in the main scanning direction is set shorter than the distance in the main scanning direction between the lines that are set so as to pass the spots from the same light source among the plural light sources and extend over the distance occupied by all of the spots in the sub scanning direction.

17 Claims, 9 Drawing Sheets

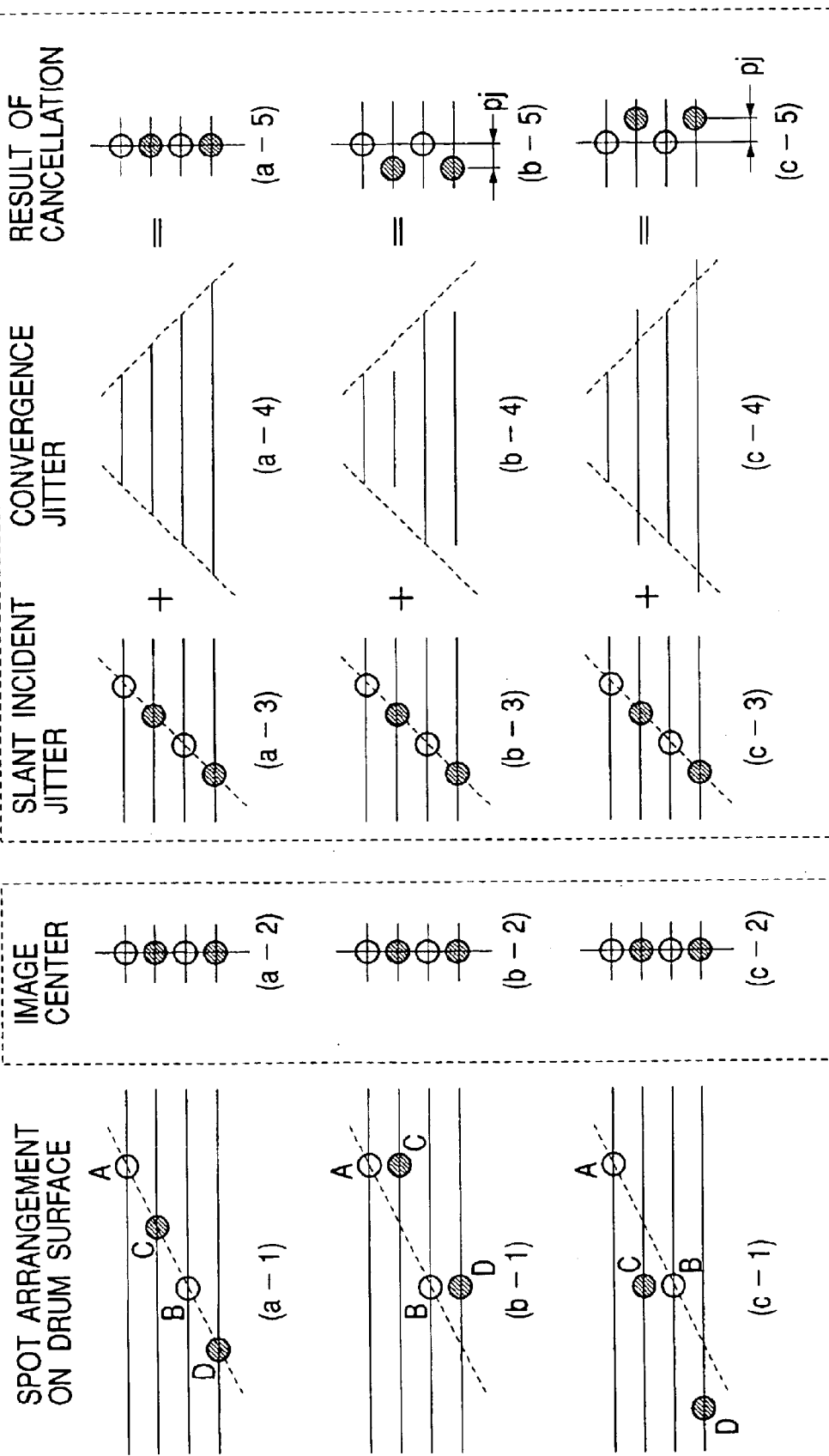

OPTICAL SCANNER AND IMAGE FORMING APPARATUS USING THE SAME

BACKGROUND OF THE INVENTION

1. Field of the Invention

The present invention relates to an optical scanner and an image forming apparatus utilizing the optical scanner. More specifically, the present invention relates to an apparatus such as a laser beam printer or a digital copying machine, in which a multi-emission semiconductor laser having plural light emission portions is used as a light source for achieving high speed and high density printing.

2. Related Background Art

FIG. 7 shows a cross section of a main portion of a conventional multibeam scanning optical system in the main scanning direction, in which plural light sources are used and each of the light sources has two light emission portions.

In FIG. 7, a multi-emission semiconductor laser 91AB having two light emission points emits two light beams, which are collimated substantially by a collimator lens 92. Then, they are focused in the sub scanning direction by a cylindrical lens 94 that has refraction power only in the sub scanning direction, shaped by an aperture 93, and are made an image like a line-extending in the main scanning direction in a vicinity of a deflection surface 95a of a polygon mirror 95 that is a light deflection device.

These two light beams are reflected and deflected by the polygon mirror 95 rotating in the direction of an arrow 95b at a constant speed. Then, they are focused by a scanning lens 96, which has the fθ property and includes lenses 96a and 96b, so as to be spots on a photosensitive drum surface 97 that is a surface to be scanned, for scanning the surface at a constant speed in the direction of an arrow 97b.

Furthermore in FIG. 7, another multi-emission semiconductor laser 91CD emits light beams, whose paths are bent by a light path combining prism 98 toward the deflection surface. Then, the light beams are focused onto the surface to be scanned by a polygon mirror 95 and scans the same similarly.

Here, optical axes of the multi-emission semiconductor lasers 91AB and 91CD are positioned so as to form a predetermined angle between them in the main scanning direction and are set so that the light beams meet substantially at the incident aperture 93.

In a multibeam optical scanner, if the plural light emission portions A and B are aligned vertically in the sub scanning direction as shown in FIG. 8, the distance between plural scan lines in the sub scanning direction on the photosensitive drum surface becomes much larger than a printing density. Therefore, the plural light emission points A and B are usually placed in a slanting direction to the sub scanning direction as shown in FIG. 9, and the slanting angle θ is adjusted so that the distance between the plural scan lines in the sub scanning direction on the photosensitive drum surface is adjusted precisely to the printing density.

In addition, since scan lines corresponding to the light beams emitted by the light emission portions C and D are added, these four spots from the four light emission points are arranged on a line alternately on the photosensitive drum surface 97 as shown in FIG. 12.

The alternate arrangement can reduce the distance between the light beams in the main scanning direction on the polygon mirror deflection surface 95a, so that displacement between image forming positions of light beams in the main scanning direction from plural light sources can be suppressed to small amount.

It is because that a beam occupying width in the main scanning direction in the case without the alternate arrangement becomes three times that in the case of two beams, while the beam occupying width in the case with the alternate arrangement is suppressed to one and a half of that in the case of two beams.

Furthermore, the reason why the above-mentioned image misregistration in the main scanning direction occurs is explained in detail in JP 2001-228422 A (columns 8–12).

When placing the optical scanner inside the image forming apparatus, laser oscillation may become unstable if the light beam that entered the photosensitive drum surface is regularly reflected by the photosensitive drum surface and goes back to the light source, i.e., the multi-emission semiconductor laser. It is also possible that the regularly reflected light may reach the photosensitive drum surface again after being reflected by a surface of an optical component inside the scanner, resulting in generation of a ghost. Therefore, up to now, it is taken into consideration that the light beam entering the photosensitive drum surface is slanted by an angle α from the normal of the photosensitive drum surface so that the light reflected by the photosensitive drum surface can not go back to the optical system or the light source again as shown in FIG. 10.

However, there is a problem that if the above-mentioned structure is adopted in which the incident light beam is slanted to the photosensitive drum, image forming positions of plural scan lines in the main scanning direction on the photosensitive drum surface become different from each other as shown in FIG. 11.

In order to solve this problem, there is a method disclosed in JP 2001-59945 A. In this method, plural light beams entering the scanning lens are made convergent light beams or divergent light beams so that image misregistration between plural generated light beams is canceled.

SUMMARY OF THE INVENTION

According to the method proposed above, the misregistration between the plural light beams in the main scanning direction can be corrected almost perfectly.

However, since actual products have errors of component dimensions in manufacturing process and positioning errors in assembly, it takes long time in adjustment processes for precise positioning.

Especially, if the position of image formation by the light beam emitted from the optical scanner is not identical to a position on the photosensitive drum surface, i.e., if there is a positioning error in the optical axis direction, the above-mentioned effect is not obtained so that increase of the spot diameter and misregistration of image forming position of plural beams in the main scanning direction occur, resulting in deterioration of image quality.

The present invention has been made in view of the above, and an object thereof is to provide an optical scanner having high performance, especially a multibeam optical scanner utilizing plural light sources having plural light emission points by reducing influences of image misregistration between scan lines in the main scanning direction even in the case where there is positioning error between the optical scanner and a drum.

It is another object of the present invention to realize cost reduction by reducing work items of positioning adjustment and by reducing the work time.

In order to achieve the above-mentioned objects, according to one aspect of the present invention, there is provided an optical scanner including:

a plurality of light sources each of which has a plurality of light emission points;

a first optical system for leading a plurality of light beams emitted by the plural light sources to a deflection surface of deflection means; and a second optical system for focusing the plural light beams deflected by the deflection means on a surface to be scanned so as to form a series of spots with a predetermined distance in the sub scanning direction, in which focusing positions of the spots on the surface to be scanned taken along the sub scanning direction are arranged sequentially toward either one sense of the main scanning direction, and a distance occupied by all of the spots in the main scanning direction is shorter than a distance in the main scanning direction between lines that are set so as to pass the spots from a single light source among the plural light sources and extend over the distance occupied by all of the spots in the sub scanning direction.

In further aspect of the optical scanner, it is preferable that the focusing positions of the spots on the surface to be scanned taken along the sub scanning direction are arranged sequentially toward either one sense of the main scanning direction, a spot from one light source is disposed between spots from another light source in the sub scanning direction, and a distance L in the main scanning direction between two spots disposed at an innermost side and emitted by different light sources among the plural light sources satisfies the following inequality:

$$W \geq L > W/n \quad (1)$$

where W represents a distance in the main scanning direction between spots from a single light source among the plural light sources, and n represents the number of light sources having plural light emission points.

In further aspect of the optical scanner, it is preferable that the focusing positions of the spots on the surface to be scanned taken along the sub scanning direction are arranged sequentially toward either one sense of the main scanning direction, a spot from one light source among the plural light sources is not disposed between spots from another light source in the sub scanning direction, and a distance L in the main scanning direction between neighboring spots emitted by different light sources among the plural light sources satisfies the following inequality:

$$W > L \geq 0 \quad (2)$$

where W represents a distance in the main scanning direction between spots from a single light source among the plural light sources.

In further aspect of the optical scanner, it is preferable that the optical scanner further includes light path conversion means for deflecting light beams emitted by the plural light sources to a predetermined outgoing direction.

In further aspect of the optical scanner, it is preferable that at least one of the plural light sources is a semiconductor laser having a plurality of light emission points.

In further aspect of the optical scanner, it is preferable that the plural light sources and the first optical system are arranged so as to form an opening angle in the main scanning direction so that the distance in the main scanning direction between the spots of the plural light sources becomes a predetermined distance.

In further aspect of the optical scanner, it is preferable that at least one of the plural light sources is disposed at a position that does not agree to the optical axis of the second optical system in the main scanning direction so that the distance in the main scanning direction between the spots of the plural light sources becomes a predetermined distance.

In further aspect of the optical scanner, it is preferable that the light path conversion means is a combining prism made of plural prisms bonded together.

In further aspect of the optical scanner, it is preferable that the apical angle of the prism constituting the light path conversion means is set so that the distance between the spots of the plural light sources in the main scanning direction on the surface to be scanned becomes a desired distance.

In further aspect of the optical scanner, it is preferable that the light path conversion means is a plane member having reflection function.

In further aspect of the optical scanner, it is preferable that an aperture is disposed in the light path in the vicinity of the deflection surface of the deflection means.

According to another aspect of the present invention, there is provided an optical scanner including:

a first optical system for leading at least three light beams to a deflection surface of deflection means;

a second optical system for focusing sequentially as spots the at least three light beams deflected by the deflection means on a surface to be scanned with a predetermined distance in the sub scanning direction, wherein focusing positions of the spots on the surface to be scanned taken along the sub scanning direction are arranged sequentially toward either one sense of the main scanning direction, and a distance occupied by all of the spots in the main scanning direction is shorter than a distance of the spots at both ends of a virtual line on which all the spot are aligned.

In further aspect of the optical scanner, it is preferable that it further comprises a monolithic light source having the light emission points for emitting the at least three light beams on the same substrate.

In further aspect of the optical scanner, it is preferable that it further comprises a hybrid light source the light emission points of at least three light beams on different substrates.

In further aspect of the optical scanner, it is preferable that the first optical system has a function for converting the plural light beams into convergent light beams.

According to still another aspect of the present invention, there is provided an image forming apparatus including:

the above-mentioned optical scanner;

a photosensitive member arranged on the surface to be scanned;

a developing unit for developing an electrostatic latent image formed on the photosensitive member by the scanning light beams provided by the optical scanner as a toner image;

a transferring unit for transferring the developed toner image onto a transferring material; and a fixing unit for fixing the transferred toner image on the transferring material.

According to yet still another aspect of the present invention, there is provided an image forming apparatus including:

the above-mentioned optical scanner; and a printer controller for converting code data entered from an external device into an image signal and for entering the image signal into the optical scanner.

BRIEF DESCRIPTION OF THE DRAWINGS

FIG. 19 shows cancel states of slant incident jitter and convergence jitter according to beam spot arrangements.

DETAILED DESCRIPTION OF THE PREFERRED EMBODIMENTS

Hereinafter, the present invention will be explained more in detail with reference to embodiments and drawings.

Figure 6:
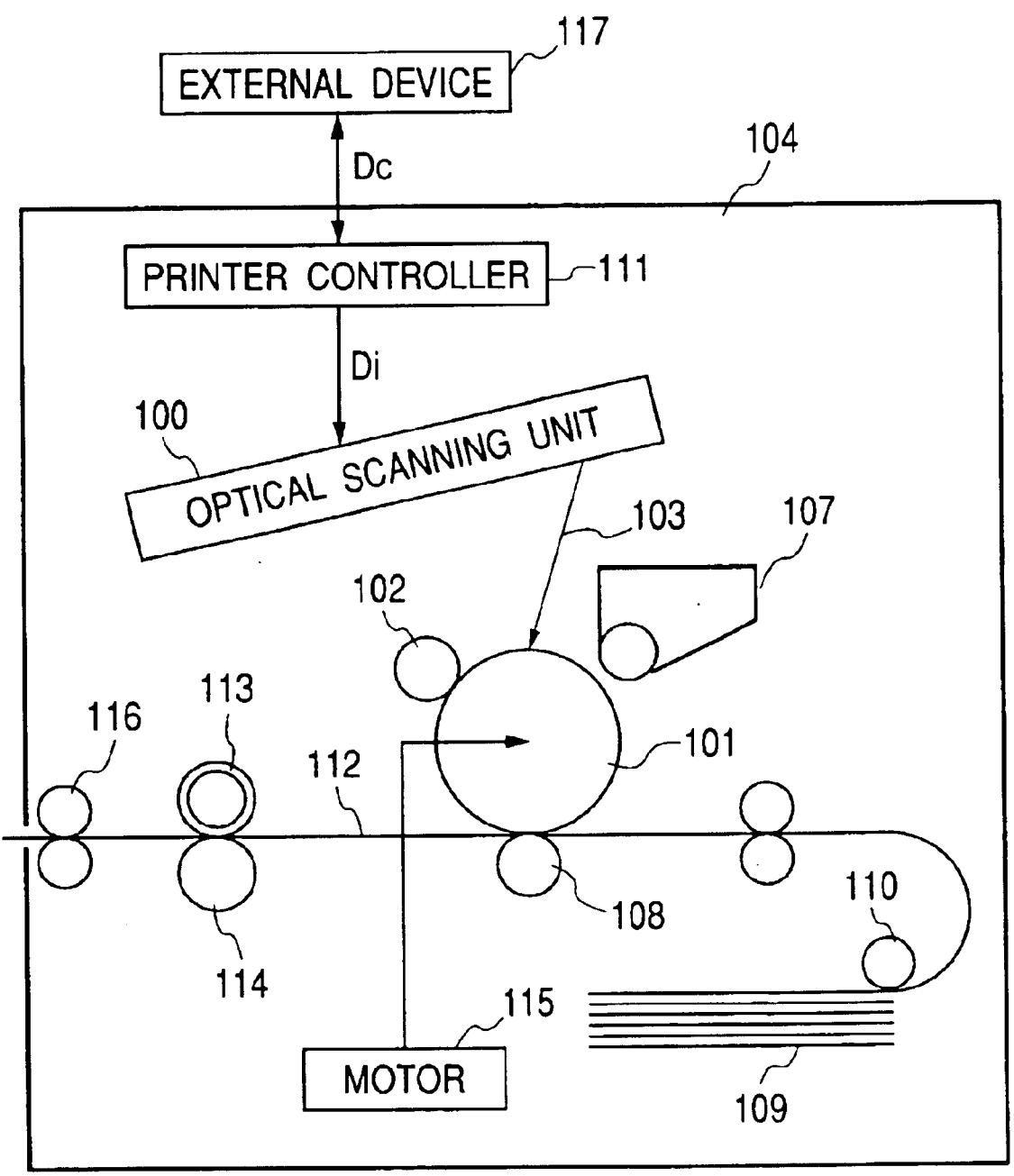
FIG. 6 is a cross section of a main portion of an image forming apparatus in the sub scanning direction according to an embodiment of the present invention.
Figure 7:
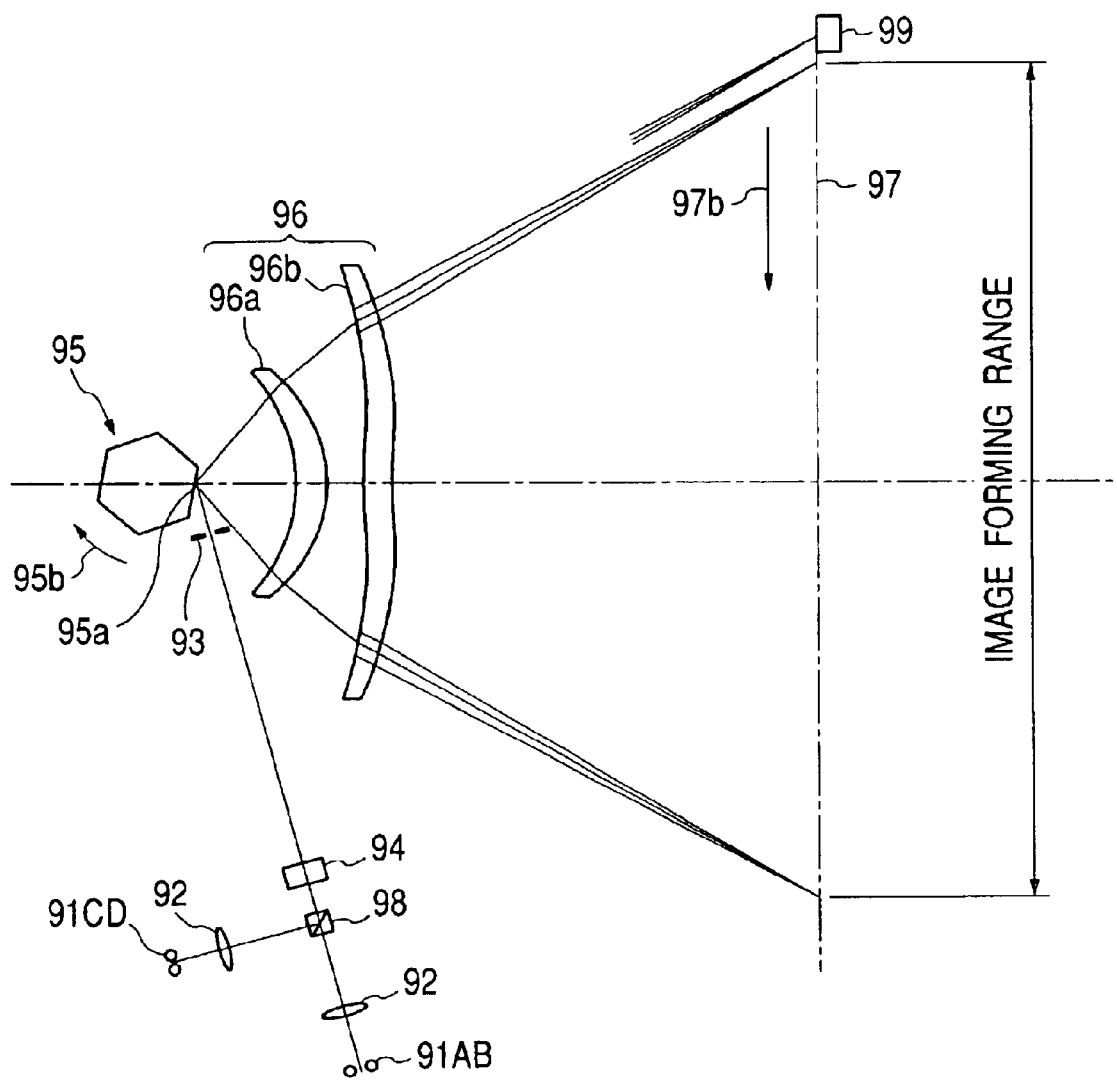
FIG. 7 is a cross section of a main portion of a conventional multibeam optical scanner in the main scanning direction.
Figure 8:
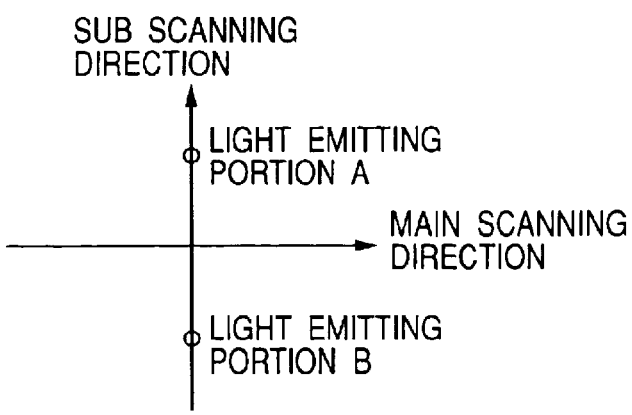
FIG. 8 shows an arrangement of light emission points that are arranged vertically in the sub scanning direction.
Figure 9:
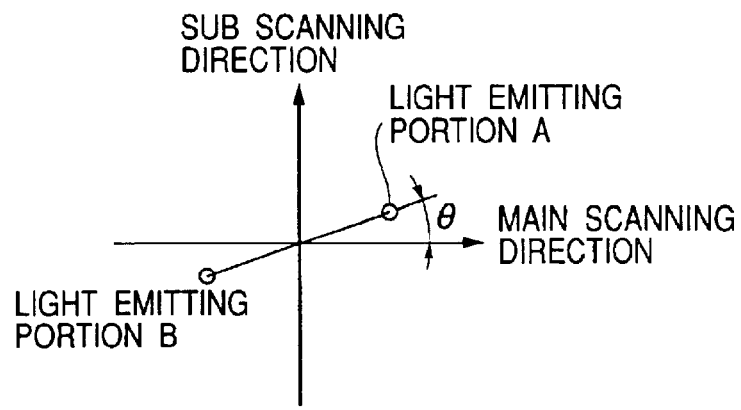
FIG. 9 shows the state where the light emission points are rotated around the optical axis.
Figure 10:
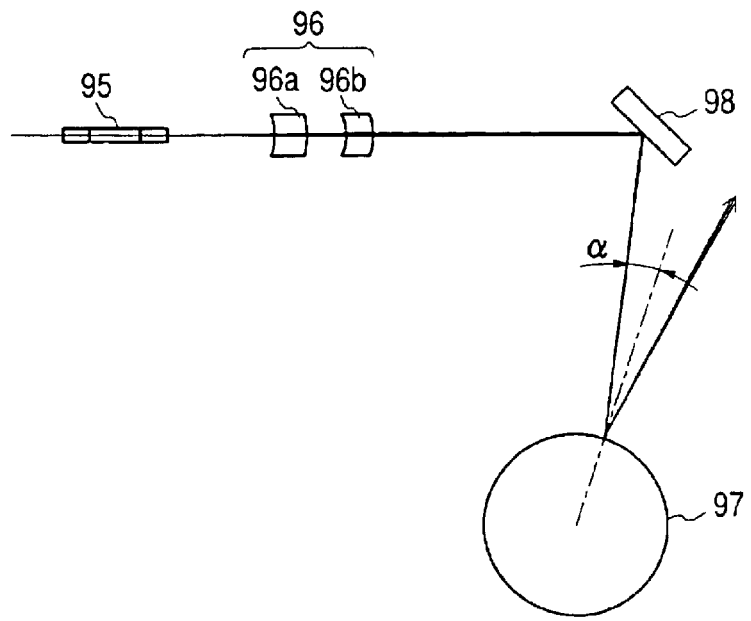
FIG. 10 is a cross section in the sub scanning direction showing the state where the light enters the photosensitive drum surface in a slanting direction.

FIG. 6 is a cross section of a main portion of an image forming apparatus in the sub scanning direction according to an embodiment of the present invention. In FIG. 6, reference numeral 104 denotes an image forming apparatus.

Code data Dc is entered into the image forming apparatus 104 from an external device 117 such as a personal computer.

The code data Dc are converted into image data (dot data) Di by a printer controller 111 in the apparatus. The image data Di are entered into an optical scanning unit 100 having a structure that will be explained in first through third embodiments.

The optical scanning unit 100 emits a light beam 103 modulated in accordance with the image data Di, and this light beam 103 scans the photosensitive surface of the photosensitive drum 101 in the main scanning direction.

The photosensitive drum 101 that is an electrostatic latent image bearing member (a photosensitive member) is rotated by a motor 115 in the clockwise direction.

According to the rotation, the photosensitive surface of the photosensitive drum 101 moves relatively to the light beam 103 in the sub scanning direction that is perpendicular to the main scanning direction.

Above the photosensitive drum 101, an electrifying roller 102 is positioned so as to abut and electrify the surface of the photosensitive drum 101 of the photosensitive drum 101 uniformly.

The surface of the photosensitive drum 101 electrified by the electrifying roller 102 is irradiated with the light beam 103 that is deflected by the optical scanning unit 100.

As explained above, the light beam 103 is modulated in accordance with the image data Di, and the light beam 103 is irradiated so as to form an electrostatic latent image on the surface of the photosensitive drum 101.

The electrostatic latent image is developed as a toner image by a developing unit 107 that is positioned at the downstream side of an irradiation spot of the light beam 103 in the rotation direction of the photosensitive drum 101 so as to abut the photosensitive drum 101.

The toner image developed by the developing unit 107 is transferred onto a paper sheet 112 that is a target material of image transferring by a transferring roller 108 that is positioned under the photosensitive drum 101 so as to face the photosensitive drum 101.

The paper sheet 112 is stored in a paper cassette 109 at the front side of the photosensitive drum 101 (at the right side in FIG. 6), but manual sheet feed is also available. A sheet feed roller 110 is disposed at an end portion of the paper cassette 109 for feeding a paper sheet 112 from the paper cassette 109 to a transport path.

In this way, the paper sheet 112 with the unfixed toner image is conveyed to a fixing device positioned at the rear side (at the left side in FIG. 6) of photosensitive drum 101.

The fixing device includes a fixing roller 113 having a fixing heater (not shown in FIG. 6) inside and a pressurization roller 114 positioned so as to press the fixing roller 113. The fixing device applies a pressure to the paper sheet 112 conveyed from the transferring portion at a press-contacting portion between the fixing roller 113 and the pressurization roller 114 while heating the same so as to fix the unfixed toner image on the paper sheet 112.

In addition, a pair of deliver rollers 116 is disposed at the back side of the fixing roller 113 for delivering the paper sheet 112 with the fixed image to the outside of the image forming apparatus.

Though it is not illustrated in FIG. 6, the printer controller 111 performs not only the data conversion explained above but also control of the motor 115, various portions inside the image forming apparatus, a polygon motor inside the optical scanning unit that will be explained later and others.

Next, an optical scanner according to an embodiment of the present invention will be explained with reference to FIGS. 1 and 2.

Figure 1:
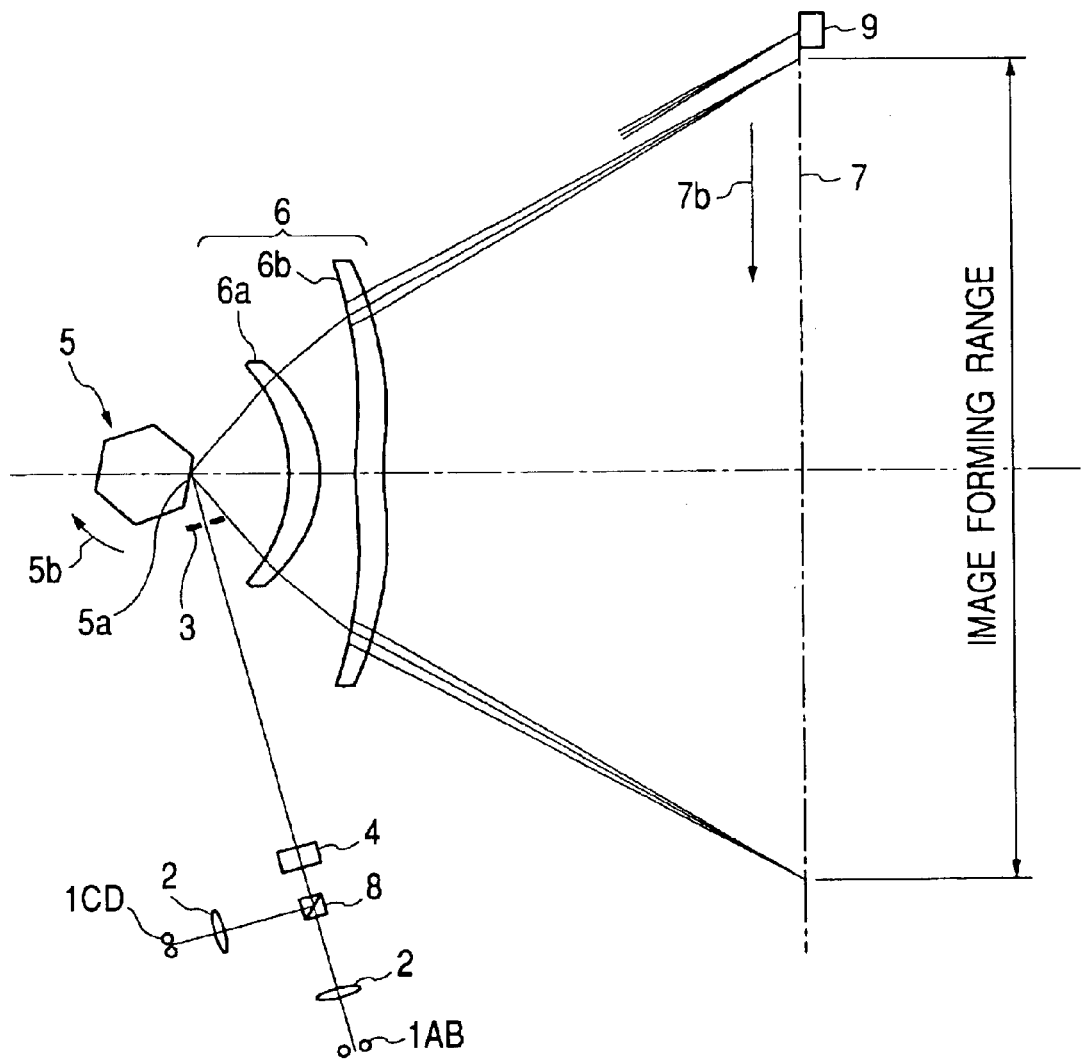
FIG. 1 is a cross section of a main portion in the main scanning direction according to an embodiment of the present invention.

FIG. 1 is a cross section of a main portion of an optical scanner in the main scanning direction according to the present invention. The light source includes semiconductor lasers 1AB and 1CD, each of which includes two light emission points. Each of the semiconductor lasers is supplied with an image signal that is driven by a predetermined clock by a light emission control portion (not shown in FIG. 1) so that the light emission is controlled.

Reference numeral 2 denotes a collimate lens for each light source as a first optical system. The light beam emitted by each light source as slightly focused light enters the scanning lens 6 that will be explained later.

Reference numeral 4 denotes a common cylindrical lens that also constitutes the first optical system and has a power only in the sub scanning direction. The focal point is set to be adjacent to a deflection surface 5a of a polygon mirror 5 that is a deflection device and is controlled at a constant rotation speed.

The light beams from two light sources 1AB and 1CD are combined by a combining prism 8 that is a light path converter so as to make a light path. Both of the light beams are directed toward the deflection surface, and the principal rays of all light beams meet each other at an aperture 3.

Reference numeral 6 denotes a scanning lens that is made of an optical resin and includes two optical elements 6a and 6b as a second optical system. The scanning lens 6 has the fθ property for scanning the target surface 7 with the light beam deflected by the polygon mirror 5 at a constant speed in the direction 7b.

The surface to be scanned 7 is an image bearing member made of a photosensitive drum, which is rotated at a constant speed in the direction that is perpendicular to the main scanning direction so as to form an image sequentially in the sub scanning direction.

Next, the action of the optical scanner will be explained.

The light source 1AB and the light source 1CD each having two light emission points are adjusted so as to focus emitted light beams at a predetermined scanning distance between them in the sub scanning direction on the surface to be scanned 7 by rotating the semiconductor laser around the optical axis or by other method. Thus, the light beam from each of the light sources after being made slightly converging light by the collimate lens 2 enters the cylindrical lens 4 with a small opening angle in the main scanning direction made by the combining prism.

The opening angle in the main scanning direction can be set by rotating a set of at least one light source and the collimate lens in the main scanning direction.

The combining prism as combining means is made of two right-angle prisms that are processed to have half mirrors and are bonded together. However, the combining means are not limited to this structure but can be realized by setting the polarizing directions of the light sources 1AB and 1CD to be perpendicular to each other and by using a polarizing prism instead of the half mirror. It can be also combined with a wavelength plate if necessary.

It is also possible to set an apical angle not to be the right angle but so that the distance between the beam spots on the scanning surface in the main scanning direction becomes a predetermined value, or to set the apical angle in the sub scanning direction so that focus lines are positioned separately in the sub scanning direction on the deflection surface 5a. Furthermore, instead of the prism a plane half mirror can be used in accordance with necessity.

As another method, without using the combining means, plural light sources and collimator lenses can be united as a set, and the optical axes can be set to form the opening angle in the main scanning direction so as to meet substantially on the deflection surface.

The light beams emitted by the light emission points form line images extending in the main scanning direction at a predetermined distance between them in the sub scanning direction in the vicinity of the deflection surface 5a of the polygon mirror 5 effected by the cylindrical lens 4. The aperture 3 that restricts light beams just before entering the polygon mirror 5 makes the principal rays of the light beams meet each other. Since the incident positions at the deflection surface 5a in the main scanning direction are made substantially the same, the image misregistration of the light beams in the main scanning direction due to the positioning error of the surface to be scanned 7 or defocus of the scanning lens 6 can be suppressed (see JP 2001-228422 A)

The light beam deflected by rotation of the polygon mirror 5 is directed to the scanning lens 6 sequentially.

The scanning lens 6 includes two lenses 6a and 6b made of an optical resin as explained above. The scanning lens has different shapes in the main scanning direction and in the sub scanning direction by forming process that enables more flexible surface shapes.

In the main scanning direction, each of the optical elements 6a and 6b has an aspheric surface shape and fθ property for scanning the surface to be scanned 7 that is the photosensitive drum at a constant speed with the light beam deflected by the polygon mirror 5 rotating at a constant speed.

The surface shape in the sub scanning direction has different curvature altering along the main scanning direction for appropriate aberration correction so that good imaging performance is maintained over the entire angle of view.

In addition, the deflection surface 5a and the surface to be scanned 7 are set to have a conjugate relationship in the sub scanning direction. Thus, a so-called tilt correction system is realized in which the light beam that is focused temporarily in the sub scanning direction in the vicinity of the deflection surface 5a is refocused on the surface to be scanned.

The optical scanner of this embodiment is provided with a detection portion 9 for detecting write timing at one end portion of the surface to be scanned 7 in the main scanning direction.

This is for utilizing a part of the scan line that is scanned in the main scanning direction and for performing synchronous detection for write timing control of a real image by the scan line.

It is not always necessary to detect all of the beam spots for detecting the write timing. If one of two beams or one of four beams is detected, other beams can be controlled by using a delay time. Otherwise, various methods may be adopted.

Figure 2:
FIG. 2 is a cross section of a main portion in the sub scanning direction according to an embodiment of the present invention.

The surface to be scanned 7 that is made of a photosensitive drum is arranged with a shift from the optical axis so that a straight line connecting the center portion of the photosensitive drum and a point on the surface of the drum to be irradiated by the light beam and the optical axis of the optical scanner define an angle α as shown in FIG. 2. Thus, as explained above, even if returning light from the photosensitive surface is generated, it enters in a slanting direction and cannot go back to the light source via the light path previously followed.

The relationship between the above-mentioned image misregistration between the scan lines in the main scanning direction due to the slant incidence to the photosensitive drum (hereinafter referred to as a slant incident jitter) and a jitter due to the fact that the light beam entering the scanning lens is convergent light (hereinafter referred to as a convergence jitter) will be explained below.

The light beams A and B emitted by the light source 1AB and the light beams C and D emitted by the light source 1CD enter the scanning lens as convergent light and are focused on the photosensitive drum surface by the scanning lens.

Here, light spots corresponding to the light emission points are referred to as spot A, B, C and D, respectively. The arrangement of these spots on the photosensitive drum is as shown by (a-1) in FIG. 19.

Figure 11:
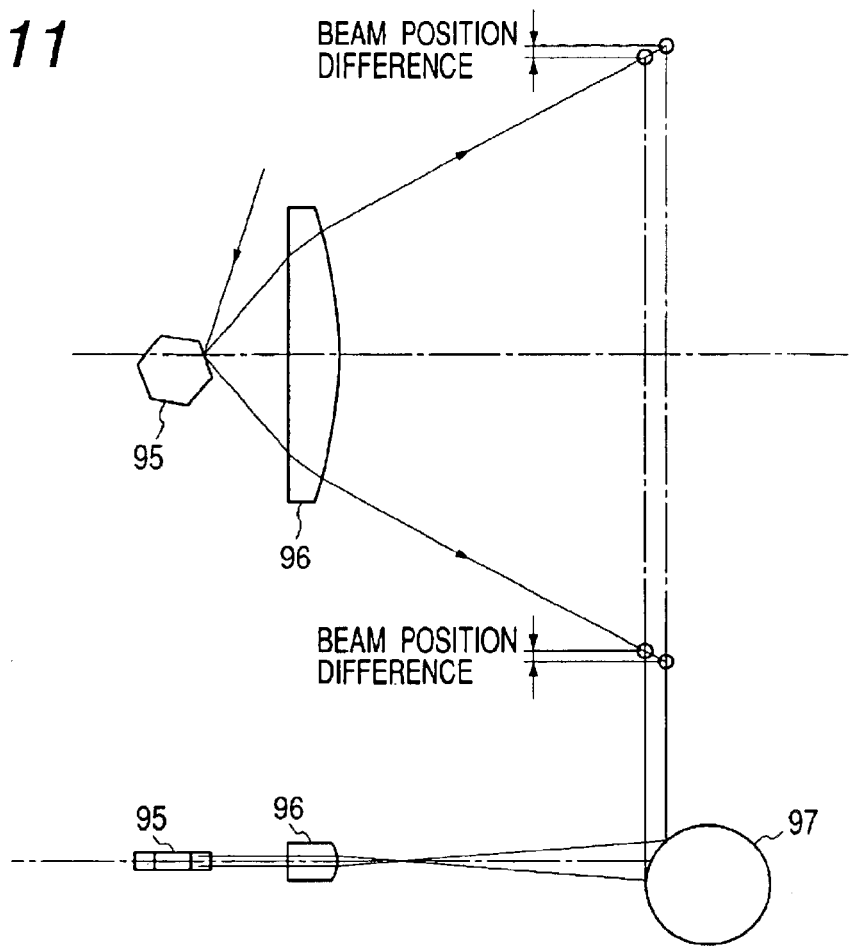
FIG. 11 shows the fact that the slanting incident light into the photosensitive drum makes image forming positions in the main scanning direction different between two beams.
Figure 12:
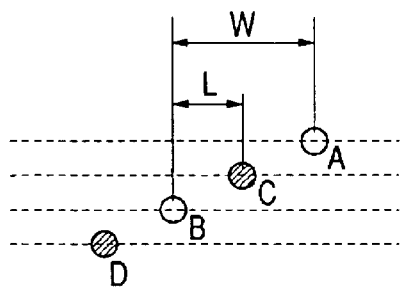
FIG. 12 shows the state where four light beams are aligned ideally on the scanning surface.
Figure 13:
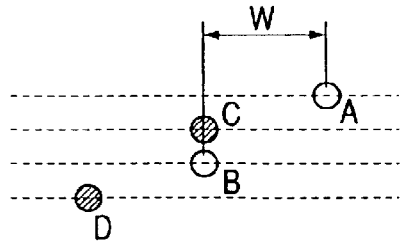
FIG. 13 shows a beam spot arrangement where linearity of four light beams is deteriorated.
Figure 17:
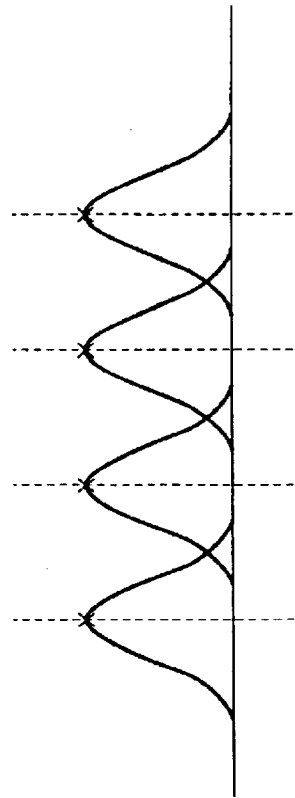
FIG. 17 shows beam spot intensity distribution in the beam spot arrangement shown in FIG. 14.

If the light beams emitted by the light sources 1AB and 1CD are focused on the photosensitive drum surface 7 to be spots as shown by (a-1) in FIG. 19, BD detection is performed in each of the spots A–D. Therefore, in the vicinity of the center portion of the photosensitive drum surface 7, the spots are aligned in the sub scanning direction as shown by (a-2) in FIG. 19. On the other hand, as shown in FIG. 2, the photosensitive drum surface 7 and the optical axis of the optical scanner are arranged so as to form the angle α in the sub scanning direction in this embodiment. Therefore, as explained with reference to FIG. 11, the slant incident jitter shown by (a-3) in FIG. 19 is generated at the end portion of the photosensitive drum surface 7 in the main scanning direction.

While the slant incident jitter at the left side end portion of the photosensitive drum surface 7 is shown by (a-3) in FIG. 19, it is easily understood that the slant incident jitter at the right side end portion of the photosensitive drum surface 7 has the opposite arrangement to the case shown by (a-3) in FIG. 19.

In addition, if the light beam that enters the scanning lens 6 is convergent light beam, a convergence jitter shown by (a-4) in FIG. 19 is generated. The entire region from the left side end portion to the right side end portion of the photosensitive drum surface 7 is shown by (a-4) in FIG. 19. The slant incident jitter shown by (a-3) in FIG. 19 and the convergence jitter shown by (a-4) in FIG. 19 cancel each other. Therefore, the spots are aligned in the sub scanning direction at all positions on the surface to be scanned 7 as shown by (a-5) in FIG. 19, so that the optical scanner having no jitter can be realized.

Here, it is supposed that the light beams emitted by the light sources 1AB and 1CD are focused on the photosensitive drum surface 7 to be arranged as shown by (b-1) in FIG. 19.

In this case too, the BD detection is performed at each of the spots A–D. Therefore, in the vicinity of the center portion of the photosensitive drum surface 7, the spots are aligned in the sub scanning direction as shown by (b-2) in FIG. 19.

In the same way as explained above, the photosensitive drum surface and the optical axis of the optical scanner form the angle α in the sub scanning direction. Therefore, the slant incident jitter shown by (b-3) in FIG. 19 is generated at the end portion of the photosensitive drum surface in the main scanning direction.

It should be noted here that although the position of the spot shown by (a-1) in FIG. 19 is different from that shown by (b-1) in FIG. 19, the slant incident jitter shown by (a-3) in FIG. 19 is the same as that shown by (b-3) in FIG. 19.

This is because that regardless of the position of the spot shown by (a-1) or (b-1) in FIG. 19, the BD detection is performed at all spots A–D, or a delay time is provided, so that all spots are forced to be aligned in the sub scanning direction in the vicinity of the center portion of the photosensitive drum surface 7 as shown by (a-2) and (b-2) in FIG. 19.

Next, the convergence jitter that is generated by making the light beam entering the scanning lens 6 be a convergent light beam will be considered. Since the convergence jitter is determined uniquely by the position where the light beams emitted by the light sources 1AB and 1CD are focused on the photosensitive drum surface 7, the convergence jitter shown by (b-4) in FIG. 19 is generated.

Details of this reason are explained in JP 2001-059945 A.

Consequently, it is difficult to cancel the slant incident jitter shown by (b-3) in FIG. 19 with the convergence jitter shown by (b-4) in FIG. 19 completely. As a result, the jitter Pj shown by (b-5) in FIG. 19 is remained.

The remaining jitter at the left side end portion of the photosensitive drum surface 7 is shown by (b-5) in FIG. 19.

It is needless to mention that the remaining jitter at the right side end portion has the opposite arrangement to the case shown by (b-5) in FIG. 19.

Furthermore, the case where the light beams emitted by the light sources 1AB and 1CD are focused on the photosensitive drum surface 7 to be arranged as shown by (c-1) in FIG. 19 will be considered.

In this case too, because of the reason as explained above, it is difficult to cancel the slant incident jitter shown by (c-3) in FIG. 19 with the convergence jitter shown by (c-4) in FIG. 19. As a result, the jitter Pj shown by (c-5) in FIG. 19 is remained.

Though the remaining jitter at the left side end portion of the photosensitive drum surface 7 is shown by (c-5) in FIG. 19, it has the opposite direction to the case shown by (b-5) in FIG. 19. Furthermore, the remaining jitter at the right side end portion of course has the opposite arrangement to the case shown by (c-5) in FIG. 19.

In the above explanation, the light beam that enters the scanning lens 6 is made a convergent light beam so that the generated convergence jitter cancel the slant incident jitter. However, it is possible to cancel the slant incident jitter by making the light beam that enters the scanning lens 6 be a divergence light beam (i.e. with a negative focusing rate).

Next, the case where there is a positioning error between the optical scanner and the photosensitive drum will be considered.

Figure 20:
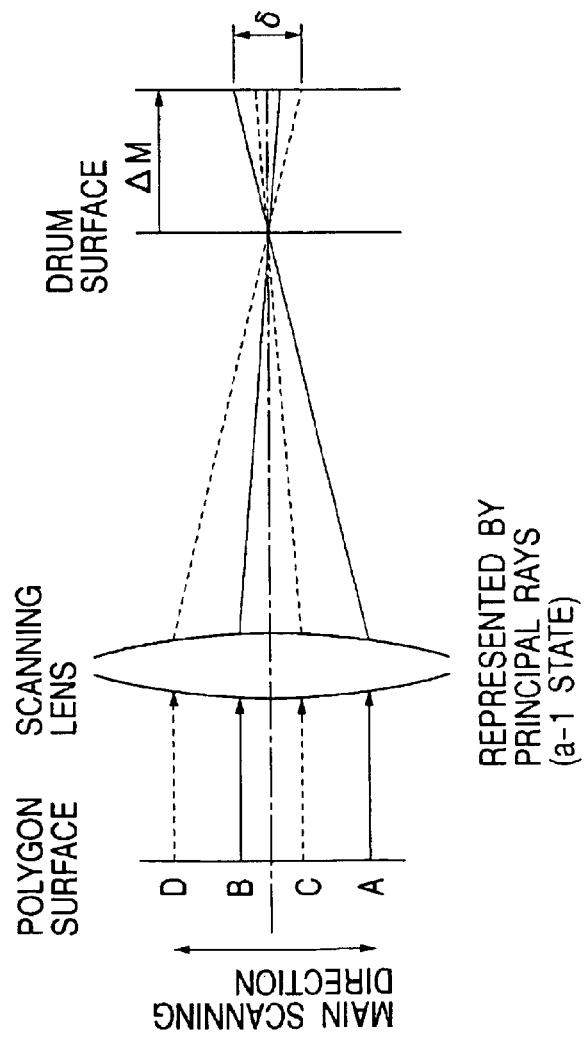
FIG. 20 shows a relationship between positioning error of the photosensitive drum or defocus amount of the scanning lens and image misregistration amount in the main scanning direction.

As shown in FIG. 20, if the slant incident jitter and the convergence jitter cancel each other, the image forming positions of the spots are identical to each other in the main scanning direction.

If the photosensitive drum surface is located at the position before or after the focus position of the scanning lens in the optical axis direction, there is a distance between the image forming positions of the spots in the main scanning direction as understood from the main light beam shown in FIG. 20.

It is easily understood that this shift 6 of the image forming position in the main scanning direction is proportional to the shift δ of the photosensitive drum surface in the optical axis direction.

In addition, similar phenomenon occurs when the defocus of the scanning lens 6 in the main scanning direction is generated.

Figure 21:
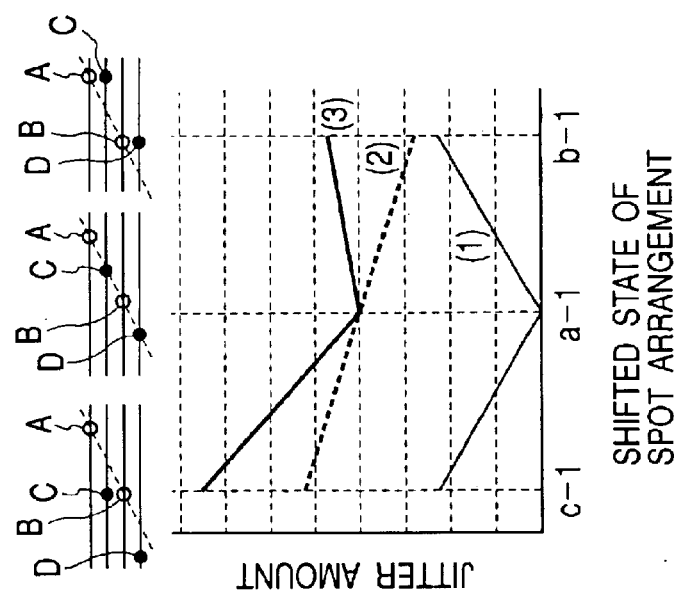
FIG. 21 shows remaining jitters in the beam spot arrangements and influence to the jitter when positioning error of the photosensitive drum or defocus of the scanning lens exists.

Considering the above-explained remaining jitter after canceling the slant incident jitter and the convergence jitter and the jitter due to the positioning error of the photosensitive drum or the defocus of the scanning lens 6, a graph shown in FIG. 21 is obtained.

FIG. 21 shows jitters at the left side or the right side end portion of the photosensitive drum surface. The vertical axis indicates jitters due to each of the factors, while the horizontal axis indicates directions and quantities of the spot arrangements in the main scanning direction on the photosensitive drum surface, with corresponding beam spot arrangements being illustrated.

Concerning data in the graph, the line (1) shows an absolute value of the remaining jitter after canceling the slant incident jitter and the convergence jitter, so that the difference due to the beam spot arrangement in the main scanning direction is illustrated.

The line (2) shows an absolute value of the jitter generated by the defocus per millimeter in the optical axis direction when the photosensitive drum positioning error or the defocus exists. The line (3) shows a total sum of the lines (1) and (2).

As understood from the graph, the total sum of the jitters is smaller in the arrangement of b-1 than the arrangement of c-1.

In other words, it is understood that in order to suppress the influence of the jitter generated by the positioning error of the optical scanner and the photosensitive drum or by the defocus, it is more advantageous concerning the positioning error to set the distance between the spots shorter than the entire distance when arranging uniformly in the main scanning direction.

Figure 14:
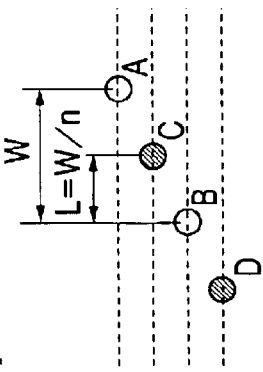
FIG. 14 shows an ideal state of beam spot arrangement in which four light beams are arranged alternately.

Next, conditions of beam spot arrangement for utilizing the effect mentioned above will be explained. It is supposed that multi-scan is performed in the optical scanner that utilizes two light sources each of which has two light emission points and that the spots formed by the light beams emitted by the two light sources are arranged alternately at a constant distance in the main scanning direction and in the sub scanning direction as shown in FIG. 14, for example. When W represents the distance between the spots formed by the light beams emitted by the same light source in the main scanning direction, the distance between the spots formed by the light beams emitted by the different light sources is W/n (n is the number of light sources having plural light emission points).

Figure 15:
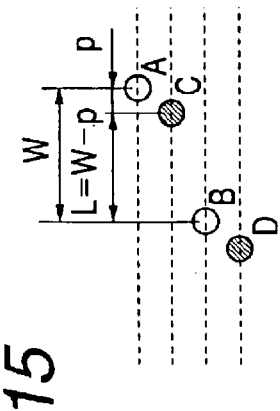
FIG. 15 shows a beam spot arrangement where both sides of four light beams move close to each other in the alternate arrangement.

Furthermore, FIG. 15 shows the case where the arrangement is advantageous to the above-mentioned positioning error or defocus as shown by b in FIG. 21. It also shows the example in which the distance between the spots A and C in the main scanning direction is set to p by shifting the spots C and D formed by the light beams emitted by the same light source to approach the spots A and B formed by the light beams emitted by the other light source in the main scanning direction. The distances between the spots in this case are p, W−p and p from the left side.

Figure 18:
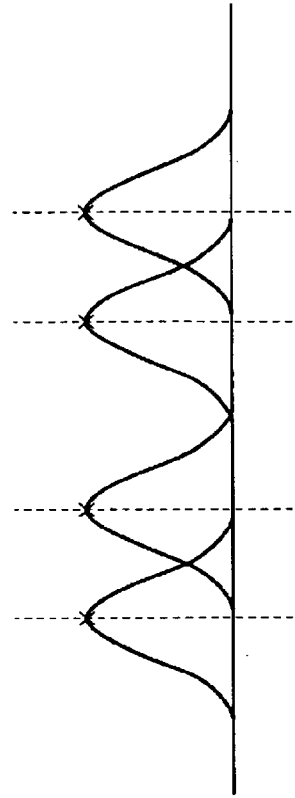
FIG. 18 shows beam spot intensity distribution in the beam spot arrangement shown in FIG. 15.

The illustrated intensity distribution of the spot in this case is shown in FIG. 18. It is necessary to secure the distance $\omega$ at least for separating the spots when performing the simultaneous detection for each spot. However, a method is adopted recently in which one of the spots is used for the simultaneous detection and electrical delay is used for synchronizing other spots, and thus the securing of the above-mentioned distance is not essential.

Therefore, the state of L=W that is advantageous condition for jitters is considered.

As explained above, an upper limit or a lower limit of the distance between the spots in the main scanning direction is set considering the influence of the jitter due to the positioning error. The image forming positions of the spots on the surface to be scanned in the main scanning direction along the sub scanning direction is arranged sequentially toward the same direction in the main scanning direction. In addition, a spot formed by a light beam emitted by one light source is arranged between spots formed by the light beams emitted by the other light source in the sub scanning direction. In this case, a distance L in the main scanning direction between two spots disposed at an innermost side and formed by the light beams emitted by different light sources satisfies the inequality (1) below.

$$W \geq L > W/n \quad (1)$$

Here, W represents an image forming distance in the main scanning direction between spots formed by the light beams emitted by the same light source, and n represents the number of light sources having plural light emission points.

The distance occupied by all spots in the main scanning direction becomes smaller than the distance of the uniform arrangement in the main scanning direction shown in FIG. 14.

Figure 16:
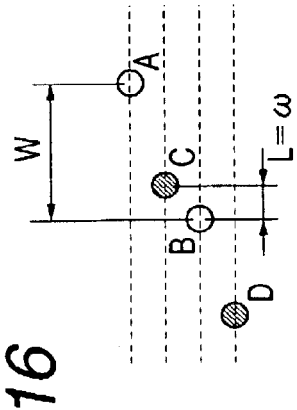
FIG. 16 shows a beam spot arrangement where both sides of four light beams move away from each other in the alternate arrangement.

If L is set to a value that does not satisfy the above inequality (1) e.g., L=$\omega$ ($\omega$: spot diameter) as shown in FIG. 16, the entire distance in the main scanning direction becomes 2W−$\omega$. Since the entire distance in the main scanning direction is longer than 3/2W in the case shown in FIG. 14 and corresponds to the case shown by (c-3) in FIG. 19, the configuration is disadvantageous to the positioning error.

Figure 3:
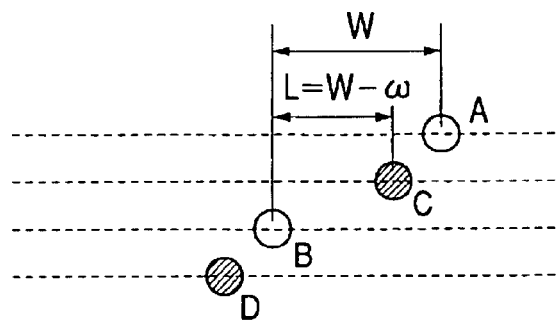
FIG. 3 shows a first embodiment of the present invention.
Figure 4:
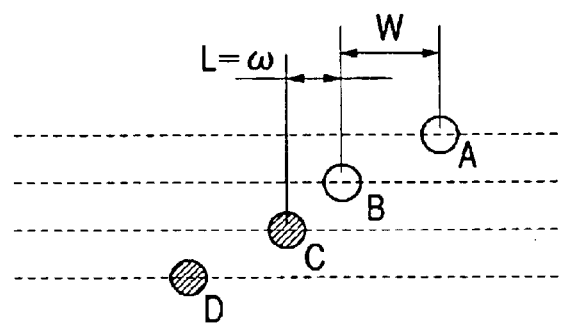
FIG. 4 shows a second embodiment of the present invention.

The case shown in FIG. 4 can be considered to be similar to the principle explained for the above-mentioned nesting case shown in FIGS. 19 to 21. However, according to the principle, it is preferable to reduce the distance between the spot A and the spot D in the main scanning direction for shortening the distance between the spot A and the spot D in the main scanning direction, resulting in the opposite form to the nesting case shown in FIG. 3.

Furthermore, in the case of arrangement for each light source in the main scanning direction on the surface to be scanned, the occupied area in the main scanning direction is set shorter than the case of the uniform arrangement in the main scanning direction in the same way as explained above. In addition, in order to suppress the remaining jitter, the distance L of the neighboring spots formed by light beams emitted by different light sources in the main scanning direction is set to a value that satisfies the following inequality (2).

$$W > L \geq 0 \quad (2)$$

If the simultaneous detection is performed for each spot under the condition of the number of light sources n and the spot diameter $\omega$, the above inequality (1) is replaced with the following inequality (3), and the above inequality (2) is replaced with the following inequality (4).

$$W - (n-1)\omega \geq L > W/2 \quad (3)$$

$$W > L \geq \omega \quad (4)$$

An example in which the beam spot arrangement according to the present invention is adopted will be explained below with reference to drawings.

(First Embodiment)

FIG. 3 shows an embodiment in which light beams emitted by semiconductor lasers having two light emission point are combined, and two spots per each are arranged on the surface to be scanned alternately in the main scanning direction, i.e., the nesting arrangement.

The two light sources are tilted around the optical axis by the same angle so as to form a distance in the sub scanning direction. In addition, the light source and the collimator lens are tilted in the sub scanning direction so that the incident angles of the four light beams into the deflection device deflection surface are different to each other in the sub scanning direction. Otherwise, by using combining means such as a prism, outgoing angles in the sub scanning direction are set to be different to each other.

In this case, the distance L at the portion where the spots formed by light beams emitted by two light sources are exchanged is shorter than the normal light emission point distance W. Since W−ω that is substantially the upper limit in the above inequality is secured, the state is advantageous to the positioning error.

In this example, the distances between spots in the main scanning direction are ω, W−ω and ω from the left side.

This arrangement is the same as the above-mentioned state shown in FIG. 20 in which the shift of the light source in the positive direction is indicated. It is an advantageous arrangement that generates the smallest jitter dispersion due to the positioning error.

Here, taken into consideration that the simultaneous detection is performed for each spot, the positions in the main scanning direction are separated by providing the space ω in the main scanning direction. However, if the above-mentioned method is used in which the simultaneous detection is performed only for one light beam, it is possible to set L=W.

(Second Embodiment)

The next embodiment shown in FIG. 4 uses the arrangement in which two light sources having two light emission points are used and four spots are arranged sequentially for each light source on the surface to be scanned.

In this case, the jitter that will be generated is larger than that in the first embodiment. In order to reduce the jitter, the present invention is effective.

Namely, the distance between the spot A and the spot B in the main scanning direction and the distance between the spot C and the spot D in the main scanning direction are set to the same lengths as in the nesting case shown in FIG. 3, the distance between the spot A and the spot D in the main scanning direction becomes longer in the case shown in FIG. 4, resulting in larger amount of the jitter generation.

In this embodiment, the distance L between two spots in the middle portion is shortened to the spot diameter ω.

In this way, the entire width occupying in the main scanning direction becomes 2W+ω, and distances between spots become W, ω and W, respectively. Since entire width is smaller than 3W that is in the case of the uniform arrangement, this arrangement can suppress the above-mentioned divergence in the main scanning direction.

(Third Embodiment)

In order to promote high speed process while maintaining high resolution, it is effective to utilize two light sources, three light sources or more light sources.

Here, an example will be explained in which three semiconductor lasers having two light emission points are used in the nesting state.

A method combining the light paths by utilizing three semiconductor lasers includes the method of using the combining prism as explained above and the method using two mirrors for combining sequentially. However, it is not limited to these methods, and the structure in which a prism and a mirror are combined can be adopted.

Figure 5:
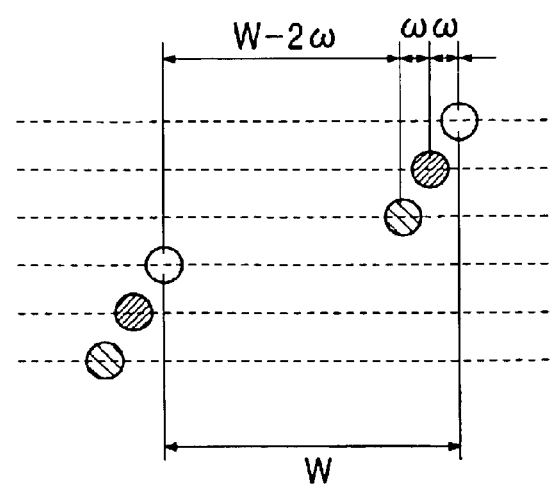
FIG. 5 shows a third embodiment of the present invention.

In this example having six light beams as shown in FIG. 5, an arrangement is adopted in which both ends of the beam spot arrangement in the main scanning direction are narrowed.

Namely, though the normal arrangement without nesting has the distance of 5W, the arrangement with nesting has the distance of 5/3W. Therefore, this distance is shortened so that the arrangement has the distance of W+2ω.

In this way, the influence of the generated jitter can be suppressed even if there is a positioning error between the scanning system and the drum surface in the optical axis direction.

The distances in this arrangement are ω, ω, W−2ω, ω and ω.

(Fourth Embodiment)

In the first through third embodiments as shown in FIG. 1, a hybrid light source arrangement is adopted in which monolithic semiconductor lasers 1 that are disposed at different positions and have two light emission points are combined, but the present invention is not limited to this structure.

A monolithic light source arrangement can be adopted in which a monolithic semiconductor laser is used that is a plate on which three or more light emission points are arranged on the same substrate. The monolithic semiconductor laser can be an end surface light emission type that includes three or more light emission points arranged in one dimensional direction or a surface light emission type that includes three or more light emission points arranged in two dimensional direction.

As explained above, by setting the distance occupied by all spots on the surface to be scanned in the main scanning direction shorter than the distance of the line in the main scanning direction in which the line passes the spots formed by the light beams emitted by the same light source and extends over the distance occupied by all spots in the sub scanning distance, it becomes easy to maintain the image quality without setting a rigorous tolerance or without using much time for restricting the positioning error between the optical scanner and the photosensitive drum or restricting defocus of the scanning lens or without using a lot of days for adjustment, and it is possible to maintain the characteristics in good performances.

In addition, the effect of the present invention can contribute to cost reduction since the yield is improved because of the easy adjustment as explained above and the number of days necessary for adjustment is reduced.

What is claimed is:

1. An optical scanner comprising:
   a plurality of light sources each of which has a plurality of light emission points;
   a first optical system for leading a plurality of light beams emitted by the plural light sources to a deflection surface of deflection means; and
   a second optical system for focusing the plural light beams deflected by the deflection means on a surface to be scanned so as to form a series of spots with a predetermined distance in the sub scanning direction, wherein
   focusing positions of the spots on the surface to be scanned taken along the sub scanning direction are arranged sequentially toward either one sense of the main scanning direction, and a distance occupied by all of the spots in the main scanning direction is shorter than a distance in the main scanning direction between lines that are set so as to pass the spots from a single light source among the plural light sources and extend over the distance occupied by all of the spots in the sub scanning direction.

2. An optical scanner according to claim 1, wherein the focusing positions of the spots on the surface to be scanned taken along the sub scanning direction are arranged sequentially toward either one sense of the main scanning direction, a spot from one light source is disposed between spots from another light source in the sub scanning direction, and a distance L in the main scanning direction between two spots disposed at an innermost side and emitted by different light sources among the plural light sources satisfies the following inequality:

$$W \geq L > W/n \qquad (1)$$

where W represents a distance in the main scanning direction between spots from a single light source among the plural light sources, and n represents the number of light sources having plural light emission points.

3. An optical scanner according to claim 1, wherein the focusing positions of the spots on the surface to be scanned taken along the sub scanning direction are arranged sequentially toward either one sense of the main scanning direction, a spot from another light source among the plural light sources is not disposed between spots from the other light source in the sub scanning direction, and a distance L in the main scanning direction between neighboring spots emitted by different light sources among the plural light sources satisfies the following inequality:

$$W > L \geq 0 \qquad (2)$$

where W represents a distance in the main scanning direction between spots from a single light source among the plural light sources.

4. An optical scanner according to claim 1, further comprising light path conversion means for deflecting light beams emitted by the plural light sources to a predetermined outgoing direction.

5. An optical scanner according to claim 1, wherein at least one of the plural light sources is a semiconductor laser having a plurality of light emission points.

6. An optical scanner according to claim 1, wherein the plural light sources and the first optical system are arranged so as to form an opening angle in the main scanning direction so that the distance in the main scanning direction between the spots of the plural light sources becomes a predetermined distance.

7. An optical scanner according to claim 1, wherein at least one of the plural light sources is disposed at a position that does not agree to the optical axis of the second optical system in the main scanning direction so that the distance in the main scanning direction between the spots of the plural light sources becomes a predetermined distance.

8. An optical scanner according to claim 4, wherein the light path conversion means is a combining prism made of plural prisms bonded together.

9. An optical scanner according to claim 8, wherein the apical angle of the prism constituting the light path conversion means is set so that the distance between the spots of the plural light sources in the main scanning direction on the surface to be scanned becomes a desired distance.

10. An optical scanner according to claim 4, wherein the light path conversion means is a plane member having reflection function.

11. An optical scanner according to claim 1, wherein an aperture is disposed in the light path in the vicinity of the deflection surface of the deflection means.

12. An optical scanner comprising:
a first optical system for leading at least three light beams to a deflection surface of deflection means;
a second optical system for focusing sequentially as spots the at least three light beams deflected by the deflection means on a surface to be scanned with a predetermined distance in the sub scanning direction, wherein
focusing positions of the spots on the surface to be scanned taken along the sub scanning direction are arranged sequentially toward either one sense of the main scanning direction, and a distance occupied by all of the spots in the main scanning direction is shorter than a distance of the spots at both ends of a virtual line on which all the spot are aligned.

13. An optical scanner according to claim 12, further comprising a monolithic light source having light emission points for emitting the at least three light beams on a single substrate.

14. An optical scanner according to claim 12, further comprising a hybrid light source having light emission points for emitting the at least three light beams on different substrates.

15. An optical scanner according to claim 1, wherein the first optical system has a function for converting the plural light beams into convergent light beams.

16. An image forming apparatus comprising:
an optical scanner according to any one of claims 1 to 15;
a photosensitive member arranged on the surface to be scanned;
a developing unit for developing an electrostatic latent image formed on the photosensitive member by the scanning light beams provided by the optical scanner as a toner image;
a transferring unit for transferring the developed toner image onto a transferring material; and
a fixing unit for fixing the transferred toner image on the transferring material.

17. An image forming apparatus comprising:
an optical scanner according to any one of claims 1 to 15; and
a printer controller for converting code data entered from an external device into an image signal and for entering the image signal into the optical scanner.

* * * * *

UNITED STATES PATENT AND TRADEMARK OFFICE
CERTIFICATE OF CORRECTION

PATENT NO. : 6,829,068 B2
DATED : December 7, 2004
INVENTOR(S) : Seiichiro Mori

It is certified that error appears in the above-identified patent and that said Letters Patent is hereby corrected as shown below:

Column 2,
Line 46, "takes" should read -- takes a --.

Column 4,
Line 39, "spot" should read -- spots --; and
Line 45, "source" should read -- source with --.

Column 7,
Line 51, "ing light by" should read -- ent by --.

Column 8,
Line 24, "A)" should read -- A). --.

Column 10,
Line 64, "shift 6" should read -- shift δ --; and
Line 66, "shift δ" should read -- shift ΔM --.

Column 13,
Line 4, "point" should read -- points --.

Column 16,
Line 27, "spot" should read -- spots --.

Signed and Sealed this

Thirty-first Day of May, 2005

JON W. DUDAS
*Director of the United States Patent and Trademark Office*